(12) United States Patent
Wolf et al.

(10) Patent No.: US 10,059,814 B2
(45) Date of Patent: *Aug. 28, 2018

(54) METHOD FOR PRODUCING READY-TO-USE SOFT PVC FILMS OR PROFILES

(71) Applicant: SIKA TECHNOLOGY AG, Baar (CH)

(72) Inventors: Ulrich Wolf, Laax (CH); Fabian Frei, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/113,579

(22) PCT Filed: Feb. 12, 2015

(86) PCT No.: PCT/EP2015/053029
§ 371 (c)(1),
(2) Date: Jul. 22, 2016

(87) PCT Pub. No.: WO2015/121386
PCT Pub. Date: Aug. 20, 2015

(65) Prior Publication Data
US 2017/0009028 A1    Jan. 12, 2017

(30) Foreign Application Priority Data

Feb. 13, 2014 (EP) .................................. 14155077

(51) Int. Cl.
| | | |
|---|---|---|
| C08J 3/18 | (2006.01) | |
| B29C 47/00 | (2006.01) | |
| B29C 47/36 | (2006.01) | |
| B29C 47/40 | (2006.01) | |
| B29C 47/92 | (2006.01) | |
| B29C 47/78 | (2006.01) | |
| B29C 47/82 | (2006.01) | |
| B29C 47/86 | (2006.01) | |
| C08J 5/18 | (2006.01) | |
| B29B 7/48 | (2006.01) | |
| B29B 7/56 | (2006.01) | |
| B29B 7/88 | (2006.01) | |
| C08K 5/12 | (2006.01) | |
| B29C 47/10 | (2006.01) | |
| B29K 27/06 | (2006.01) | |

(52) U.S. Cl.
CPC .................. *C08J 3/18* (2013.01); *B29B 7/48* (2013.01); *B29B 7/568* (2013.01); *B29B 7/88* (2013.01); *B29C 47/0004* (2013.01); *B29C 47/364* (2013.01); *B29C 47/367* (2013.01); *B29C 47/402* (2013.01); *B29C 47/788* (2013.01); *B29C 47/822* (2013.01); *B29C 47/862* (2013.01); *B29C 47/92* (2013.01); *C08J 5/18* (2013.01); *C08K 5/12* (2013.01); *B29C 47/1063* (2013.01); *B29C 47/1081* (2013.01); *B29C 2947/92047* (2013.01); *B29C 2947/92704* (2013.01); *B29K 2027/06* (2013.01); *C08J 2327/06* (2013.01)

(58) Field of Classification Search
CPC ........................................................ C08J 3/18
USPC ......................................................... 524/296
See application file for complete search history.

(56) References Cited

U.S. PATENT DOCUMENTS

| | | | | |
|---|---|---|---|---|
| 4,698,378 A | * | 10/1987 | Wehrli .................... | B01F 5/205 523/307 |
| 5,437,826 A | * | 8/1995 | Martinello .......... | B29C 47/1063 264/102 |
| 2004/0084795 A1 | * | 5/2004 | Hornsby ................. | B01J 3/008 264/41 |
| 2016/0115308 A1 | | 4/2016 | Zhao | |

FOREIGN PATENT DOCUMENTS

| | | |
|---|---|---|
| CH | 484959 A | 1/1970 |
| CN | 1479671 A | 3/2004 |
| CN | 102977509 A | 3/2013 |
| CN | 103224674 A | 7/2013 |
| DE | 3125396 A1 | 1/1983 |
| DE | 694 10 846 T2 | 11/1998 |
| EP | 0 426 619 A2 | 5/1991 |
| EP | 0611250 A1 | 8/1994 |

OTHER PUBLICATIONS

Apr. 1, 2015 International Search Report issued in International Patent Application No. PCT/EP2015/053029.

"ZSK Twin Screw Extruders. The Benchmark for Maximum Throughput and Highest Product Quality in Modern Processing Technology." Dec. 31, 2011, pp. 1-26, XP055131557, Stuttgart, Germany, URL: http://www.schall-virtuell.de/sixcms/media.php/244/ZSK_gesamt_2011_englisch.pdf.

H. Potente et al. "Determination of the Degree of Gelation of PVC With DSC". Kunststoffe-German Plastics, 1987, vol. 77, No. 4, pp. 401-404.

Jul. 7, 2017 Office Action issued in European Patent Application No. 15706183.9.

(Continued)

*Primary Examiner* — Doris L Lee
(74) *Attorney, Agent, or Firm* — Oliff PLC

(57) ABSTRACT

The extrusion of polymer compositions based on polyvinyl chloride (PVC) and in particular to a method in which polymer compositions are produced that have an elongation at break of at least 200%, a tensile strength of at least 10 N/mm2 with a specific energy input SEI of 0.03 to 0.20 kWh/kg and in particular 0.04 to 0.16 kWh/kg. The method is expediently carried out such that a plasticizer is added in a plurality of portions to the non-composed polyvinyl chloride and mixed into said polyvinyl chloride. The method thereby offers a fast and simple possibility of producing products from finished soft PVC, the production of said products requiring only a single processing device in the form of an extruder.

16 Claims, No Drawings

(56) References Cited

OTHER PUBLICATIONS

Aug. 16, 2016 International Preliminary Report on Patentability issued in International Patent Application No. PCT/EP2015/053029.
Mar. 8, 2018 Office Action issued in Chinese Patent Application No. 201580008318.7.

* cited by examiner

METHOD FOR PRODUCING READY-TO-USE SOFT PVC FILMS OR PROFILES

TECHNICAL FIELD

The invention relates to the production of polymer compositions based on polyvinyl chloride (PVC).

PRIOR ART

The high stability of PVC with respect to combustion and also its low price and advantageous processing qualities are among the main reasons why this material is nowadays one of the most widely used varieties of plastic. According to the prior art, PVC must be compounded with stabilizers before it can be used for the production of end products or intermediates as for example by shaping methods using extrusion. The term "compounding" refers to a separate processing step in which raw PVC (i.e. the product obtainable directly from the polymerization of vinyl chloride) is mixed, while being heated, with stabilizing additives and optionally with plasticizers, fillers, and further additives, in order to form a substantially homogeneous material. This material is sold as an intermediate product, in the form of pellets or granules, for example, to the end processor.

The compounding of PVC requires considerable quantities of energy and is therefore a significant cost factor in the processing of PVC. To date, however, only a few methods have been described in which compounding can be circumvented. It was long assumed that compounding was an absolute necessity in PVC production, the expectation being that uncompounded PVC would undergo considerable decomposition in the course of its extrusion. Depending on application, PVC today is differentiated as flexible PVC and rigid PVC. Rigid PVC is used to produce components such as pipes and profiles, for windows, for example, while flexible PVC, which includes a significant fraction of plasticizer, is frequently used for sheathing of cables. Other frequent applications of flexible PVC are found in floor coverings, hoses, footwear soles, roof seals, or else rubber gloves. Flexible PVC, as mentioned, includes a significant fraction of plasticizers, which endows the inherently hard PVC material with plastic qualities, such as a desirable conformity, in particular. In the course of thermoplastic working, the plasticizers become lodged between the molecular chains of the PVC, thereby loosening its structure.

One factor important for flexible PVC is the gelation of the PVC material. It has decisive consequences for the mechanical properties of the material, and also for its weldability. Gelation begins typically at temperatures above 130° C. in the presence of PVC and plasticizers, and is usually concluded at temperatures around 190° C., where a degree of gelation of 100% is reached. For example, the tensile strength and elongation at break go up with increasing degree of gelation. For PVC products which can be used industrially, a degree of gelation in the range from 10% to 50% is unfavorable, since it leads to relatively poor mechanical properties, which are unsuitable for the majority of applications. A degree of gelation in the range of 60% or more, in contrast, affords mechanical properties which are considered as usable. On the other hand, the degree of gelation must not be too high. Accordingly, while the mechanical properties do continue to improve at degrees of gelation of more than 95%, the high degree of gelation leads to problems with the weldability of the material. Hence PVC with a degree of gelation of more than 100% is no longer weldable, meaning that it can only be subsequently worked at temperatures which lead to thermal damage and to breakdown of the material.

Gelation is dependent on the processing temperature and the time for which the material is exposed to this temperature. The key factor here is the temperature. It is also noteworthy that gelation is not reversible. The degree of gelation of PVC is therefore determined substantially by the maximum temperature during the processing of the material. Standard flexible PVC materials are processed commonly at a temperature between 170 and 190°, resulting in a degree of gelation in the range from 70% to 100% and in a good balance between mechanical properties and weldability.

Flexible PVC products are produced nowadays generally via intermediates, as for example by a "dry blend" (i.e., a special mixture of PVC powder) or through the use of precompounded PVC pellets. Another route is that called "direct compounding", as will be elucidated in more detail below:

Production of PVC "dry blends":

In this process, PVC, additives, processing aids, fillers, and plasticizers are heated in a high-speed mixer to temperatures of about 100 to 120° C. This process yields a homogeneous, dry powder with greater or lesser flowability. The end product at this stage is not gelled (degree of gelation about 0%) and is used as an intermediate for the following methods A and B.

A) Production of Gelled Pellets

For this purpose, the "dry blend" product is introduced into an extruder, heated to form a homogeneous melt, and then shaped into granules or pellets of uniform size. In the course of heating, the temperature is generally between 140 and 160° C., and so a degree of gelation below 100% is attained. The pellets produced are subsequently introduced into a second extruder, where they are heated and shaped into a flat web or a profile.

B) Processing of the Dry Blend

The dry blend material is introduced into an extruder, heated with melting at 170 to 190° C., and pressed through a die for producing a flat web or through a profiled die to form a profile.

In direct compounding, the intermediate stage in the production of a PVC dry blend is removed. Instead, the raw materials are introduced in one step into an inlet of a corotating twin-screw or planetary roller extruder. In this case the mixture of PVC, additives, fillers, and plasticizers together is heated. The process has the disadvantage, however, that the residence time in the extruders described is often low (≤30 seconds), resulting in a relatively low degree of gelation below 50% after direct compounding. A consequence of this is that the product cannot be processed further directly into membranes or profiles. The extruded material is therefore transferred to a calender block, which raises the residence time to about 2 to 5 minutes and can be used to set a degree of gelation of 70% to 90%. The calender technology allows the residence time to be increased, something normally not possible by means of an extruder. With an extruder, the residence time is only 30 seconds to 2 minutes, a figure which can be increased using a calender to up to 15 minutes (dependent on the size and throughput of the calender). On exiting the calender block, the material is also devolatilized, in order to prevent bubbles in the finished membrane. A disadvantage of direct compounding, however, is that this process cannot be used to produce profiles.

A feature common to the processes described above is that the in some cases multiple heating and cooling necessitate a relatively high energy input in order to set the desired properties, especially in relation to elongation at break and tensile strength. For instance, for the production of the dry blend alone, an energy input is required, measured on the basis of the SEI (Specific Energy Input), of between 0.05 and 0.10 kW*h/kg. The further processing of the dry blend produced requires a further energy input in the region of 0.10 to 0.40 kW*h/kg, and so, in the overall balance, an energy input in the region of at least 0.15 kW*h/kg is required.

DE 694 10 846 T2 describes a method for the direct production of compounded PVC by means of an extruder, in which added constituents such as stabilizers, fillers, and optionally plasticizers are mixed with the PVC within the extrusion operation, and the PVC can subsequently be extruded directly to form webs.

The process described in that application provides for liquid plasticizer and a mineral filler to be mixed into the PVC material. In that case the filler is added at a relatively early point in time, i.e., before the addition of substantial fractions of the plasticizer to the PVC material. This process, though, yields a flexible PVC which has relatively unfavorable mechanical properties, such as, in particular, unadvantageous tensile strength and elongation at break.

The objective and problem addressed by the present invention, accordingly, is that of overcoming the disadvantages of the prior art and of providing a method which while minimizing the energy expenditure affords a flexible PVC material having favorable mechanical properties, especially in respect of tensile strength and elongation at break, and also a degree of gelation which enables subsequent welding of the composition. The intention, furthermore, is that the flexible PVC can be produced easily and quickly, with as far as possible only a single processing step being required. Furthermore, the method is to be flexible enough to allow the production therewith of different PVC products, such as flat webs, sheets, profiles, etc. Lastly, the energy input needed for this method is to be extremely low, in order to improve profitability relative to the processes presently available.

In accordance with the invention it has been found that this objective is achieved with a method for extruding a homogeneous polymer composition, which has a degree of gelation of 60% to 100%, an elongation at break of at least 200%, and a tensile strength of at least 10 N/mm$^2$, from an uncompounded polyvinyl chloride, which is characterized in that the method has a specific energy input (SEI) of 0.03 to 0.20 kWh/kg, more particularly 0.04 to 0.16 kWh/kg. With particular preference the method has a specific energy input (SEI) of 0.05 to 0.15 kWh/kg, most preferably 0.06 to 0.14 kWh/kg (depending on the viscosity of the formulation).

"Uncompounded polyvinyl chloride" for the purposes of the present invention refers to raw PVC (i.e.), the product obtainable directly from the polymerization of vinyl chloride). This PVC may admittedly have been physically mixed with a stabilizing additive, for example, but unlike compounded polyvinyl chloride it is not treated thermally in order to allow the incorporation, for example, of stabilizing additive or plasticizer.

"Homogeneous polymer compositions" in the context of the invention encompass compositions in which the individual constituents are distributed substantially homogeneously. To the person skilled in the art it is immediately clear that within polymer compositions there may be regions formed which have a slightly higher fraction of a constituent than other regions, and that 100% homogeneous distribution of all the constituents is not generally achievable. Such compositions with "imperfect" distribution, however, are also intended to be embraced by the term "homogeneous polymer compositions" in accordance with the present invention.

The tensile strength and elongation at break are determined, in the context of the present invention, in accordance with DIN EN 12311-2; method B. The degree of gelation in the context of the present invention is determined with the aid of a DSC 821e (Mettler-Toledo) by the method of Potente H. *Determination of the Degree of Gelation of PVC with DSC*, Kunststoff-German Plastics, 1987, 77 (4), pp. 401-404. For this purpose, for each measurement, 10 mg of chopped material were heated from 25 to 220° C. at a heating rate of 20° C./min. The fraction of the melting endotherm occurring at lower temperatures relative to the sum of both melting endotherms is then expressed as the "degree of gelation" in percent. Regarding this method of determination it should be noted that it can be used to determine only degrees of gelation of up to 100%. Overgelling (degree of gelation>100%) is a term used in cases where the PVC has been heated above about 185° C. (for example at 195° C. for more than 1 min). At these temperatures, while there is a further increase in the tear strength of the material, there is nevertheless a decrease in the ultimate elongation. Overgelling is manifested, moreover, in the material no longer being weldable.

The method of the invention can be realized by way of example by adding the plasticizer to the PVC in two portions, which are added with a time offset from one another, and by adding solid constituents, optionally except for PVC-stabilizing additives, such as fillers, dyes or color pigments, only to the PVC at a point in time at which the major fraction of the plasticizer has been added to and taken up by the PVC.

An important feature of this embodiment of the present invention, accordingly, is that solid constituents are mixed into the polyvinyl chloride only at a point in time at which at least a major part of the plasticizer has been mixed with and absorbed by the polyvinyl chloride. Surprisingly it has been found that this regime results in a substantial improvement in the mechanical properties, such as the tensile strength and elongation at break in particular, and in an improvement in the residual thermal stability.

The PVC products produced with the method of the invention preferably have a residual thermal stability of at least 60 minutes, more particularly of at least 90 minutes, and very preferably of at least 100 minutes. The residual thermal stability is understood to be the time span within which the flexible PVC compound still does not show decomposition with elimination of HCl at a temperature of 180° C. The residual thermal stability is therefore a measure of the stability of the material under thermal load, and was determined on the basis of DIN 53 381-1.

In one preferred embodiment the method of the invention relates to the production of a polymer composition which consists substantially of
 (A) 30 to 80 wt % of polyvinyl chloride,
 (B) 0.5-5 wt % of a stabilizing additive,
 (C) 0-40 wt % of a solid constituent, and
 (D) 5-40 wt % of a plasticizer, liquid at room temperature, for the polyvinyl chloride,
where the figures in wt % are based in each case on the total weight of the polymer composition, and where the method comprises the steps of
 (I) feeding polyvinyl chloride (A) in uncompounded form into an extrusion apparatus having at least one rotor, which has at least three kneading and/or mixing zones and is capable of both transporting and mixing the mixture, (II) feeding the polyvinyl chloride (A) and stabilizing additive (B) into the extrusion apparatus through a first inlet, which is disposed in the vicinity of the drive unit and adjacent to a first conveying segment section of the at least one rotor;

(III) feeding the plasticizer to the polyvinyl chloride mixed with the stabilizing additive through at least two inlets at a distance from one another, the plasticizer being added in at least two portions each of about 20-80 wt %, based on the total weight of the plasticizer, to the polyvinyl chloride, there being a kneading and/or mixing zone disposed between the addition of the individual portions, (IV) working the plasticizer/polyvinyl chloride mixture at a temperature of or above the glass transition temperature of the polyvinyl chloride, the temperature of the mixture not exceeding 150° C., until the plasticizer has been incorporated substantially completely into the polyvinyl chloride, (V) optionally feeding the solid constituent (D) to the polyvinyl chloride mixed with the plasticizer in a section at which at least 80 wt % of the total amount of the plasticizer has been incorporated into the polyvinyl chloride, (VI) optionally devolatilizing and extruding the mixture through the extrusion die.

Constituents A and B can be supplied in unmixed form to the extruder in step (II). For reasons of expediency, however, components A and B may also be mixed with one another before being added to the extruder, without supply of heat, this having only a marginal influence on the overall energy balance of the method. In this case component (B) is preferably a material solid at 25° C. In the case of a stabilizer which was liquid at 25° C., a coating with the additive would be formed on the PVC particles on mixing with the PVC, and this coating would render the particles sticky. This can lead to problems in the further processing of the material.

An alternative, albeit less preferable, possibility is for the stabilizing additive to be added at a later point in time, as for example together with the plasticizer in step (III), to the PVC. In that case the stabilizing additive is preferably liquid.

The glass transition temperature (Tg) mentioned in step (IV), and also all glass transition temperatures, are to be determined for the purposes of the present invention with the aid of DSC (Differential Scanning calorimetry).

In one embodiment, the statement "substantially completely" in step (IV) is to be interpreted to mean that no separate phases of plasticizer and polyvinyl chloride are observed and that the mixture present is homogeneous. The point at which this is the case in an extruder may be ascertained, for example, by sampling.

In a further preferred embodiment, the method of the invention relates to the production of a polymer composition which consists substantially of (A) 30 to 80 wt % of polyvinyl chloride,
(B) 0.5-5 wt % of a stabilizing additive,
(C) 0-40 wt % of a solid constituent, and
(D) 5-40 wt % of a plasticizer, liquid at room temperature, for the polyvinyl chloride, where the figures in wt % are based in each case on the total weight of the polymer composition, which is fed in uncompounded form into the polyvinyl chloride (A) with an extrusion apparatus having at least one rotor, which has at least three kneading and/or mixing zones and which is capable of both transporting and mixing the mixture, and where the method comprises the steps of (II) feeding the polyvinyl chloride (A) and stabilizing additive (B) into the extrusion apparatus through a first inlet, which is disposed in the vicinity of the drive unit and adjacent to a first conveying segment section of the at least one rotor;

(II) feeding the plasticizer to the polyvinyl chloride mixed with the stabilizing additive through at least two inlets at a distance from one another, the plasticizer being added in at least two portions each of about 20-80 wt %, based on the total weight of the plasticizer, to the polyvinyl chloride, there being a kneading and/or mixing zone disposed between the addition of the individual portions, (III) working the plasticizer/polyvinyl chloride mixture at a temperature of or above the glass transition temperature of the polyvinyl chloride, the temperature of the mixture not exceeding 150° C., until the plasticizer has been incorporated substantially completely into the polyvinyl chloride, (IV) optionally feeding the solid constituent (D) to the polyvinyl chloride mixed with the plasticizer in a section at which at least 80 wt % of the total amount of the plasticizer has been incorporated into the polyvinyl chloride, (V) optionally devolatilizing and extruding the mixture through the extrusion die.

Steps (I), (II) and (III) are subject, analogously, to the statements made above for steps (II), (III) and (IV).

As starting material (A) for the polymer composition it is possible to use any customary, uncompounded polyvinyl chloride suitable for the production of compounded PVC. Uncompounded PVC is a commercial particulate product and may be acquired from various producers. The expression "particulate" refers to any solid form of PVC, including pulverulent, compacted, particle-like, and pelletized forms, such as pellets or beads, for example. The upper and lower limits of 30 and 80 wt % are considered critical in that at less than about 30 wt % of polymeric PVC, the quality of the end product would be unacceptable, whereas a fraction of more than 80 wt % would result in a plasticizer fraction inadequate for the production of flexible PVC. In one preferred embodiment, the polyvinyl chloride to be included in the method is polyvinyl chloride produced by suspension polymerization (also referred to as S-PVC). Relative to polyvinyl chloride produced by suspension polymerization, with polyvinyl chloride which has been produced by emulsion polymerization (also referred to as E-PVC) it is more difficult to produce products having suitable properties. Accordingly, the polyvinyl chloride to be included in the method is preferably not E-PVC.

As PVC-stabilizing additive (B) it is possible in the method of the invention to use commercially available, suitable, and known compositions or mixtures. A minimum of about 0.5 wt % is considered to be critical, since below this figure, commercial stabilizing additives or mixtures of such additives do not impart a sufficiently long-term stabilizing effect. At more than 5 wt % of the overall composition, on the other hand, there are no additional stabilizing advantages, whereas other product properties such as optical and mechanical qualities, for example, may suffer. Preferred stabilizing additives are inorganic heavy metal salts, metal soaps, especially those of barium, lead, zinc or calcium, and also dibutyl tin and dioctyl tin compounds, and epoxidized soya bean oil. Particularly preferred are calcium/zinc stabilizers or barium/zinc stabilizers, which are immediately familiar to the person skilled in the art. The stabilizing additive may be liquid or solid at 25° C., with solid being preferred.

Besides PVC and a stabilizing additive, the polymer compositions for processing in accordance with the invention comprise preferably 0 to 40 wt %, more preferably 0.01 to 35 wt %, and most preferably about 0.3 to 30 wt % of a solid constituent (C). A solid constituent for the purposes of the invention is characterized in that it does not dissolve in the PVC but instead forms a particulate constituent. Solid constituents of this kind include, in particular, fillers, dyes, and color pigments. The solid constituent preferably encompasses fillers, more particularly mineral fillers, and optionally color pigments. Fillers particularly suitable in connection with the present invention are kaolin and calcium carbonate. Particularly preferred color pigments are carbon black and titanium dioxide.

A further important constituent of the polymer compositions which can be produced in accordance with the method outlined here is a liquid plasticizer (D). The amount of the liquid plasticizer in the polymer composition is expediently about 5 to 40 wt %, more particularly about 15 to 40 wt %, and more preferably about 20 to 40 wt %. An especially preferred plasticizer fraction is 30 to 35 wt %. As is familiar to the person skilled in the art, the amount of the plasticizer incorporated into the polyvinyl chloride is dependent on the intended applications properties. Hence a relatively small fraction of plasticizer is sufficient for the production of a relatively solid PVC, while for the production of flexible polyvinyl chlorides, more particularly those which are subsequently weldable, a higher fraction of plasticizer is required.

Plasticizer suitable in connection with polyvinyl chloride are, in particular, liquid plasticizers such as high-boiling esters of an acid, preferably of terephthalic acid or adipic acid, and of one or more alcohols, such as butanol or alkanols having 8 to 12 carbon atoms. Particularly suitable plasticizers in the context of the present invention are dioctyl phthalate (DOP), diisononyl phthalate (DINP), diisodecyl phthalate (DIDP), and dioctyl adipate (DOA).

As already noted above, the PVC composition consists substantially of the constituents (A) to (D). "Substantially", however, is to be taken to mean that the composition does not necessarily consist exclusively of these constituents, but may additionally include small fractions of additional constituents, such as customary additions to PVC, particularly those in the form of flame retardants, lubricants, UV absorbers, blowing agents, adhesion promoters, antistats, fungicides or impact modifiers. It is also possible to admix a small amount of a second polymer constituent, such as a PVC-compatible (e.g., halogenated) polyethylene-based or acrylic acid-based polymer. In such a case, this constituent is fed into the cavity together with the particulate PVC, again without significant preliminary mixing. It is preferred, however, if these constituents together account for not more than about 10 wt %, more particularly not more than about 8 wt %, and more preferably not more than about 5 wt %, based on the total weight of the PVC composition.

One apparatus particularly suitable for the methods of the invention is an extrusion apparatus which comprises a pair of substantially isomorphous, elongate rotors which fit into the cavity and are disposed adjacent to one another for interpenetrating movement. A pair denotes the number "two". An extrusion apparatus of this kind is also referred to as a twin-screw extruder. One particularly preferred extrusion apparatus is a codirectionally rotating, closely intermeshing two-screw extruder.

The rotors are "interpenetrating" in the sense that a projection on one of the rotors, at a given location of the longitudinal and rotational position, interacts with a recess in the other rotor in the corresponding position, so that in general the distance between the rotors remains substantially constant at any point between them along the length of the cavity. The use of rotors with both conveying and also kneading and/or mixing subsections is known per se and is elucidated in more detail in EP 0 426 619. Regarding the kneading and/or mixing subsections, it should be noted that within the field of extruder technology there is no sharp cutoff between such sections, since mixing always includes an element of kneading, and kneading always includes an element of mixing. For this reason, the expressions "kneading" and "mixing" are used synonymously in the present specification.

The at least one rotor, preferably two or more rotors, used in the methods of the invention form preferably (i) a first conveying segment section adjacent to the rotor end/ends connected to the drive of the extrusion apparatus; (ii) a first mixing section downstream of and adjacent to the first conveying segment section; (iii) a second conveying segment section downstream of and adjacent to the first mixing segment section; (iv) a second mixing segment section downstream of and adjacent to the second conveying segment section; (v) a third conveying section downstream of and adjacent to the second mixing segment section. Furthermore, the rotors preferably have (vi) a third mixing segment section downstream of and adjacent to the third conveying segment section, and (vii) a fourth conveying segment section downstream of and adjacent to the third mixing segment section.

The term "downstream" used here relates to a place along the length of the rotor that is nearer to the extrusion end of the extrusion apparatus than the reference place mentioned in connection with the expression "downstream".

The fourth conveying segment section is generally disposed adjacent to the extrusion end of the extrusion apparatus, in other words to the end which is equipped with an extrusion die of a customary construction dependent on the form of the product to be produced. In order to generate the necessary pressure, especially in the case of relatively large units, it may be advisable to install a melt pump between the extruder and the extrusion die in order to prevent overheating of the polymer.

For a twin-screw extruder it is preferred if each of the rotors has a length L in the range from 32 to 60 times, preferably from 36 to 52 times, its diameter D. For a method using a twin-screw extruder it is further preferred if a first portion of plasticizer is added at an L/D ratio in the range from 1 to 8 and a second portion of plasticizer is added at an L/D ratio of about 10 to 20. The L/D ratio here is a measure of the position, based on the total length of the rotor, at which the addition is to take place.

The methods of the invention are not confined to the use of twin-screw extruders. The methods may equally well be carried out with other extrusion apparatus, such as a planetary roller extruder, an annular extruder, a multiscrew extruder or a Buss kneader, for example. If using these extrusion apparatuses, the geometry of the addition especially of the plasticizer should be adapted accordingly.

For the method of the invention in accordance with the first alternative described it is expedient, as already elucidated above, for a maximum fraction of the plasticizer to be incorporated into the polyvinyl chloride before a solid constituent, such as a filler, for example, is added to the mixture. Hence it is particularly preferred if the solid constituent, preferably all of the solid constituents, is or are added to the polyvinyl chloride, which has been mixed with the plasticizer, only at a point in time at which at least 90 wt %, preferably at least 95 wt %, and more particularly at least 99 wt % of the plasticizer has been kneaded into the polyvinyl chloride. It is preferred, furthermore, if the polyvinyl chloride in step (V) is admixed with at least 80 wt %, preferably at least 95 wt %, and more preferably at least 99 wt % of the total amount of the solid constituents, i.e., of the optionally mineral fillers, pigments, and dyes that are to be incorporated into the composition. It is most preferred if all of the solid constituents are not mixed with the PVC until the plasticizer has been incorporated fully into the polyvinyl chloride. Similar comments apply in respect of step (IV) in accordance with the second alternative described.

For the methods of the invention it is further preferred if the temperature of the plasticizer for mixing with the polyvinyl chloride is adjusted to at least 30° C. below the glass transition temperature (Tg) of the polyvinyl chloride (i.e., T≥(Tg−30° C.)), preferably at least 15° C. below the Tg of the polyvinyl chloride and more preferably to the Tg or above the Tg of the polyvinyl chloride. The Tg of polyvinyl chloride may be taken expediently as a value of 80° C., corresponding to the glass transition temperature of pure polyvinyl chloride. The reason for this is that in the region at and/or above the glass transition temperature of the polyvinyl chloride, this polyvinyl chloride takes up the plasticizer particularly well, and that in the region of its transition temperature the polyvinyl chloride has softened sufficiently to allow it to be mixed effectively with the plasticizer. The means by which this temperature is achieved, however, are not critical to the invention. Hence the temperature may be accomplished, for example, by heating of the plasticizer before feeding it in, by means of heat exchangers. It is also possible for the PVC to be preheated using bulk-material heat exchangers.

In connection with the present invention it has emerged as being expedient if the amount of energy introduced by the extrusion apparatus is provided both in the form of mechanical energy (by the screw) and in the form of thermal energy, preferably by means of heating elements. In this case the PVC can be metered at room temperature, while the plasticizer is preferably preheated to a temperature above, but not mandatorily, the glass transition temperature.

If the extrusion apparatus has heating elements it is preferred if they are set to a temperature of at least 130° C., preferably at least 140° C. On the other hand, the temperature of the heating elements ought not to be too high, so that the gelation of the product does not exceed a level of 100%, something which would have adverse consequences for the weldability of the product. The temperature of the heating elements therefore is preferably not more than 200° C., more particularly not more than 195° C.

It is also preferred in the context of the present invention if the temperature for the mixing of polyvinyl chloride and the plasticizer is not so far above the glass transition temperature of the polyvinyl chloride, so that there is no premature gelation of the polyvinyl chloride. Hence it is preferred if the temperature on mixing of the plasticizer with the polyvinyl chloride, particularly for the incorporation of the first portion of the plasticizer, is preferably not more than 50° C. above the glass transition temperature of the polyvinyl chloride, preferably not more than 40° C. above the glass transition temperature of the polyvinyl chloride, and more preferably not more than 35° C. above the Tg of the polyvinyl chloride. Metering in plasticizer at temperatures below the Tg of the PVC is likewise possible.

As already elucidated above, for the methods according to the present invention it is very advantageous if the plasticizer is added in at least two portions to the polyvinyl chloride. The reason for this is that it has been observed that on addition of excessive amounts of plasticizers, reasonable mixing of the plasticizer and of polyvinyl chloride is not possible, since the plasticizer cannot be taken up quickly enough by the polyvinyl chloride. In connection with step (III), in which the incorporation of the plasticizer into the polyvinyl chloride is described, accordingly, it is preferred if the individual portions of plasticizer to be fed in to the polyvinyl chloride, which has been mixed with the stabilizing additive, account for about 30 to 70 wt %, preferably about 40 to 60 wt %, based on the total weight of the plasticizer. In connection with the present invention it has proven particularly favorable if the portion of plasticizer added first accounts for about 55±3 wt %, and the portion of plasticizer added subsequently accounts for about 45±3 wt % of the amount of plasticizer. Alternatively it may also be sensible to make the portion of plasticizer added first larger, so that it amounts to more than about 60 wt % up to 80 wt % and preferably about 64 to 76 wt %, based on the total weight of the plasticizer. The second plasticizer portion in that case corresponds to the balance to 100 wt %.

Independently from the statements above it is advantageous if the fraction of the plasticizer, based on the overall composition, which is added as the first plasticizer portion is in the range from 10 to 30 wt %, more particularly 15 to 25 wt %, and very preferably 18 to 21 wt %. Alternatively to this it may also be sensible for the fraction of plasticizer, based on the overall composition, that is added as the first plasticizer portion to be more than 20 wt %, and this fraction ought not to exceed 27 wt %. In the context of this method regime it is preferred if the fraction of the plasticizer, based on the overall composition, that is added as the first plasticizer portion is in the range from 20.1 wt % to 26 wt % and more preferably in the range from 21 wt % to 25 wt %. Within the experiments conducted it has been ascertained that through a corresponding method regime it is possible to exert positive influences on the mechanical properties, especially the tensile strength and elongation at break, and also on the residual thermal stability.

For the mixing and/or kneading zone which the PVC composition passes through after the first addition of the plasticizer it is expedient, moreover, if this zone is designed such that the plasticizer can be mixed with the polyvinyl chloride in such a way that a homogeneous mixture is formed before a second portion of plasticizer is added.

In relation to the solid constituent, more particularly the filler, it has already been indicated above that it is sensible for a maximum fraction of the solid constituent, more particularly the filler, to be added to the polyvinyl chloride only when the plasticizer has been incorporated substantially completely into the polyvinyl chloride. In this context it is most preferred if the solid constituent, more particularly the filler, is incorporated into the polyvinyl chloride only after the plasticizer has been incorporated substantially completely, i.e., to an extent of at least 90 wt %, preferably at least 95 wt %, and most preferably at least 99 wt %, into the polyvinyl chloride. The weight figures above are based on the weight of the plasticizer phase and of the separate phase of the optionally plasticizer-containing PVC.

In order to generate gelation, or a degree of gelation in the range from 60 to 100%, it is expedient, at the end of the method outlined above, for the polyvinyl chloride, before being extruded through the extrusion die, to be heated to a product temperature of at least about 150° C. to at most about 195° C., preferably about 155 to 190° C., and more preferably about 160 to about 185° C. In this temperature range the desired degree of gelation comes about in dependence on the time for which the PVC composition is exposed to this temperature. In relation to these temperatures it is preferred, however, if the composition is not exposed to these temperatures until the plasticizer has been incorporated substantially completely, i.e., to an extent of at least 95 wt %, based on the total amount of the plasticizer, into the polyvinyl chloride. The person skilled in the art is able to infer from the above that the degree of gelation is dependent on the product of temperature and of time, and is readily able to harmonize the temperature regime in the extrusion apparatus to the intended degree of gelation.

In one particularly preferred embodiment, the method of the invention is carried out on a corotating twin-screw extruder having a length L of about 44 times its diameter D, the design of the method being as follows:

(i) Feeding of S-PVC and the stabilizing additive into a mixing zone at an L/D ratio of 0 to 4.

(ii) Metered addition of liquid plasticizer, having a temperature of between 20 and 120° C., preferably 60 to 110° C., at an L/D ratio of 4 to 8.

(iii) Mixing and kneading of the PVC with the plasticizer at an L/D ratio of 6 to 16.

(iv) Metered addition of liquid plasticizer at a plasticizer temperature of between 20 and 160° C., preferably 60 to 140° C., at an L/D ratio of 14 to 20.

(v) Mixing and kneading of the PVC with the plasticizer at an L/D ratio of 16 to 24.

(vi) Addition of solid constituents, more particularly fillers and pigments, preferably via a side feed, at an L/D ratio of 20 to 28.

(vii) Dispersing of the solid constituents and further heating of the PVC/plasticizer mixture at an L/D ratio of 24 to 34.

(viii) Devolatilization of the mixture under reduced pressure to form a bubble-free product at an L/D ratio of 32 to 36.

(ix) Development of pressure for extrusion of the processed composition at an L/D ratio of 36 to 44.

For relatively large processing machines, the use of a melt pump is particularly advantageous.

One preferred application of the method of the invention is the continuous production of films and/or profiles, more particularly of film webs. In addition to the use of uncompounded PVC and feeding of the constituents of the final PVC composition into the cavity in the manner elucidated, such film production may be modeled on established film production processes and may, for example, use a slot die for the extrusion of continuous webs.

A unit for the continuous production of sheets by extrusion of a PVC composition without using or producing compounded PVC material, in accordance with the invention, as set out above, encompasses a corotating extruder as described above, a drive for the rotor, and a slot die, which is disposed after the extrusion end of the cavity for producing continuous webs of the extruded composition. A unit of this kind will generally also include suitable containers and means for the continuous feeding of measured amounts of the constituents (A) and (B) into the first inlet without substantial premixing, and for the driven feeding of measured amounts of the constituents (C) and (D) into the second and any further inlet(s).

The present invention is elucidated in more detail below by a number of examples, which, however, are not intended in any way to have a limiting effect on the scope of protection of the specification.

COMPARATIVE EXAMPLES 1 TO 5

Dry Blend and Extruder Method According to the Prior Art

PVC can in general not be processed without plasticizers, without thermal degradation of the PVC and hence the formation of hydrochloric acid occurring.

In a first step according to the method for producing dry blends in accordance with the prior art, PVC, plasticizers, additives, and fillers are introduced into a simple mixing apparatus which is operated at a high speed and which is capable of heating the mixture by means of friction. The composition for this purpose consists of 56% of a premix of S-PVC and stabilizing additives, 35% of plasticizers, and 9% of fillers and pigments. With the aid of the mixing apparatus, the mixture is heated to 110 to 120° C. and treated in the mixer until a dry, free-flowing powder has formed. Within this step the plasticizer migrates into the PVC grain. It is important that here the migration of plasticizer has fully concluded. Incomplete migration prevents the attainment of good mechanical values on processing. The specific energy input (SEI) required for this step is between 0.05 and 0.10 kWh/kg for the dry blends described.

Following this treatment, the dry blend obtained is transferred to a cooling apparatus and cooled to a temperature of less than 40° C.

The dry blend thus obtained is then passed to an extrusion apparatus where it is heated by friction or convection until a homogeneous and processable melt is obtained. This is normally the case at temperatures of 160 to 195° C. The melt is then devolatilized and extruded. Employed for this purpose were common extrusion apparatuses, such as a single-screw extruder (comparative example 1), a contrarotating twin-screw extruder (comparative example 2), a corotating twin-screw extruder (comparative example 3), a Buss kneader (comparative example 4) and a planetary roller extruder (comparative example 5). In this processing step an SEI of about 0.1 to 0.25 kWh/kg is required. Necessary overall for the production of the dry blends, therefore, are SEI values of 0.15 to 0.30 kWh/kg. The results of the investigations carried out in this context are reported in table 1 below.

The tensile strengths and elongations at break in table 1 and in the examples below were determined in accordance with DIN EN 12311-2; method B. The degree of gelation was by means of a DSC 821e (Mettler-Toledo) by the method of Potente H. *Determination of the Degree of Gelation of PVC with DSC*, Kunststoff-German Plastics, 1987, 77 (4), pp. 401-404. For this purpose, for each measurement, 10 mg of chopped material were heated from 25 to 220° C. at a heating rate of 20° C./min. The fraction of the melting endotherm occurring at lower temperatures relative to the sum of both melting endotherms is then reported as "degree of gelation" in percent.

TABLE 1

| Comparative example | Processing apparatus | Overall SEI | Mechanical properties | | Degree of gelation [%] |
| | | | Tensile strength [N/mm$^2$] | Elongation at break [%] | |
|---|---|---|---|---|---|
| 1 | Single-screw extruder | 0.26 | 19 | 350 | 85 |
| 2 | Contrarotating twin-screw extruder | 0.15 | 20 | 350 | 85 |
| 3 | Corotating twin-screw extruder | 0.16 | 19 | 350 | 90 |
| 4 | Buss kneader | 0.15 | 19 | 350 | 90 |
| 5 | Planetary roller extruder | 0.14 | 20 | 350 | 85 |

From table 1 it can be seen that with the methods available, flexible PVC products having suitable properties can be produced. As a result of the intermediate stage of producing a dry blend, however, such production requires an overall energy input (SEI) of at least 0.14 kWh/kg.

INVENTIVE EXAMPLES 1 TO 22

In the inventive examples, the constituents were supplied continuously and throughout the implementation of the experiment in accordance with their corresponding proportions. In order to simplify the experiments, however, the PVC and also the stabilizing additives were premixed cold. The separate addition of the additives is readily possible by adapting the extrusion apparatus.

In addition to the mechanical parameters determined in the comparative examples, the residual thermal stability as well was determined for the PVC products produced by the method according to the invention. This was done by reference to DIN 53 381-1, with the measurements being carried out at 180° C.

Example 1

The feed section was cooled with water in order to prevent clogging. All barrel temperatures were set to a temperature of 140° C. The screw speed was set at 160 revolutions per minute. The throughput was 15 kg/h. The extruder used was a ZE25A UT corotating twin-screw extruder from Berstorff with an L/D ratio of 44.

100% of the PVC mixed with the stabilizing additive was supplied in the feed section of the extruder. 58 wt % of the phthalate plasticizer was then supplied at a temperature of 80° C. at an L/D ratio of 6 "downstream" of the feed area for the PVC. The mixture was then mixed, kneaded and further heated. Then 42 wt % of the phthalate plasticizer was added at an L/D ratio of 16 downstream of the feed area. The PVC plasticizer mixture was mixed further, kneaded, and heated.

Downstream relative to the mixture of PVC and plasticizer, fillers and pigments were added at an L/D ratio of 24. The fillers and pigments were incorporated into the PVC by mixing and kneading. The completed mixture was then devolatilized by application of a vacuum of 100 mbar absolute pressure at an L/D ratio of 36 downstream of the feed section. The final sections of the extruder are designed for development of pressure for the flat extrusion die. The specimen producible in this way featured an SEI of only 0.057 kWh/kg, an elongation at break of 320%, and a tensile strength of 15.5 N/mm². The specimen obtained was weldable.

Example 2

Example 2 was carried out as for example 1, with the difference that the screw speed of the extruder was set at 100 rpm. The product produced in this way had an SEI of 0.05 kWh/kg, an elongation at break of 350%, and a tensile strength of 20 N/mm².

Example 3

Example 3 was carried out as for example 1, with the difference that the rotary speed of the screw was set at 330 rpm. The product obtained had an SEI of only 0.092 kWh/kg, an elongation at break of 350%, and a tensile strength of 19 N/mm². However, the product obtained was not weldable.

Example 4

Example 4 was carried out as for example 1, with the differences that the screw speed was set at 320 rpm and the throughput was increased to 30 kg/h. The product produced accordingly featured an SEI of 0.06 kWh/kg, an elongation at break of 370%, and a tensile strength of 16.5 N/mm². The product was weldable.

Example 5

Example 5 was carried out as for example 1, with the differences that the screw speed was set at 310 rpm, the throughput was increased to 30 kg/h, and no filler was added. The product produced in this way featured an SEI of only 0.082 kWh/kg, an elongation at break of 350%, and a tensile strength of 20 N/mm². The specimen was weldable.

Examples 6 and 7

Example 6 was carried out as for example 1, with the differences that the screw speed of the extruder was set at 210 rpm, the throughput was set at 18 kg/h, and the fillers and pigments were added at the L/D ratio of 1. The product obtained by means of this method featured an SEI of 0.060 kWh/kg, an elongation at break of 338%, and a tensile strength of 15.1 N/mm². The product was weldable.

Example 7 was carried out as for example 6, with the difference that the fillers and pigments were added only at an L/D ratio of 20. A product produced by this method featured an SEI of 0.060 kWh/kg, an elongation at break of 350%, and a tensile strength of 19 N/mm². The product was likewise weldable.

A key difference between the products of examples 6 and 7 lies in the residual thermal stability, which is reduced from 110 min to 94 min. A method wherein the fillers are dispersed into the PVC before the plasticizer therefore results in a greater final temperature in comparison to a method wherein the fillers are not added until a later point in time. The mechanical properties of example 6 are likewise less favorable than for example 7.

Examples 8 to 11

Examples 8 to 11 were varied by modifying the feed temperature of the plasticizer in a temperature range from 20 to 125° C. The other operational parameters correspond to those from example 7. All of the products produced had an SEI in the range from 0.06 to 0.065 kWh/kg, an elongation at break of about 350%, and a tensile strength of about 19 N/mm². Each of the specimens produced was weldable. Increasing the temperature of the plasticizer resulted in a reduction in the required motor force of the extruder and, accordingly, in a reduced SEI through the extruder motor.

Example 12

Example 12 was carried out with method parameters corresponding to example 7. However, the amount of the fillers and pigments, in comparison to example 7, was reduced from about 18 wt % to about 9 wt %, and E-PVC rather than S-PVC was used. At an SEI of 0.067 kWh/kg, however, example 12 failed to furnish a product having useful properties in respect of elongation at break and tensile strength. It is assumed that this is attributable to the very fine structure of E-PVC (particle size about 1 μm).

Examples 13 to 15

These examples were likewise carried out in the same way as for example 7, though in contrast to example 7 no fillers and pigments were added and the ratio of the addition of phthalate plasticizer in the first portion to the addition of the plasticizer in the second position was varied. The ratio of the first plasticizer portion to the second plasticizer portion was 31:69 in example 13, 64:36 in example 14, and 75:25 in example 15.

The products produced in line with this method featured an SEI of 0.135 kWh/kg, an elongation at break in the range from 320 to 380%, and a tensile strength in the 20 to 22 N/mm$^2$ range. Each of the products produced was weldable. It was found that by metering in a higher proportion of plasticizer at an L/D ratio of 6, the material produced is protected more effectively from overheating in the first mixing section. This has a positive effect on the durability of the finished product. By adding a greater amount of plasticizer at an L/D ratio of 6, the mechanical properties deteriorated in example 15. The best ratio found for the addition of plasticizer was 58 wt % and 42 wt % on addition at an L/D ratio of 6 and 16, respectively.

Examples 16 to 18

These examples were carried out as for example 1, but the temperature of the barrels was set at 120° C. (example 16), 140° C. (example 17), and 160° C. (example 18), the plasticizer was preheated to 80° C., and the screw speed was set at 180 rpm. Changing the temperature in the barrels has a direct effect on the temperature of the PVC at the end of the extrusion operation. The products produced had useful mechanical properties if a product temperature (T(max)) of more than 160° C. was attained (example 18). Temperatures below this figure, in contrast, yielded significantly less favorable mechanical properties (examples 16 and 17).

Examples 19 to 22

In these examples the effect of screw speed on the products obtained was investigated. The method parameters of these investigations correspond to those of examples 8 to 11, with the differences that the temperature of the plasticizer was 80° C. and the screw speed was varied in the range from 210 to 420 rpm. The change in the screw speed has direct consequences for the temperature of the PVC at the end of the extrusion operation and for the SEI. Products which attained a melt temperature (T(max)) of 160° C. achieved useful mechanical properties. On exceedance of a melt temperature of 195° C., however, there is a deterioration in the weldability of the products.

The compositions, parameters and results of the investigation of the examples described above are set out in table 2 below.

TABLE 2

| Example | PVC [kg] | Plast. 1 [kg/h] | Plast. 2 [kg/h] | Plast. temperature [° C.] | Fillers & pigments | Screw speed [rpm] | Energy consumption [kW] | T(max) [° C.] |
|---|---|---|---|---|---|---|---|---|
| 1 | 8.47 | 3.00 | 2.21 | 80 | 1.32 | 160 | 1.1 | 184 |
| 2 | 8.47 | 3.00 | 2.21 | 80 | 1.32 | 100 | 0.9 | 180 |
| 3 | 8.47 | 3.00 | 2.21 | 80 | 1.32 | 330 | 1.9 | 191 |
| 4 | 16.94 | 6.00 | 4.40 | 80 | 2.63 | 320 | 2.3 | 189 |
| 5 | 10.63 | 4.14 | 3.23 | 80 | 0.00 | 310 | 2.2 | 184 |
| 6 | 8.92 | 3.60 | 2.70 | 80 | 3.27@1 L/D | 210 | 1.4 | 174 |
| 7 | 8.92 | 3.60 | 2.70 | 80 | 3.27@20 L/D | 210 | 1.4 | 173 |
| 8 | 10.17 | 3.60 | 2.70 | 20 | 1.58 | 210 | 1.5 | 176 |
| 9 | 10.17 | 3.60 | 2.70 | 50 | 1.58 | 210 | 1.5 | 177 |
| 10 | 10.17 | 3.60 | 2.70 | 100 | 1.58 | 210 | 1.4 | 178 |
| 11 | 10.17 | 3.60 | 2.70 | 125 | 1.58 | 210 | 1.4 | 180 |
| 12 | 10.17 | 3.60 | 2.70 | 80 | 1.58 | 210 | 1.2 | 180 |
| 13 | 11.60 | 2.00 | 4.40 | 80 | 0.00 | 210 | 2.80 | 196 |
| 14 | 11.60 | 4.10 | 2.30 | 80 | 0.00 | 210 | 2.80 | 196 |
| 15 | 11.60 | 4.80 | 1.60 | 80 | 0.00 | 210 | 2.75 | 195 |
| 16 | 8.47 | 3.0 | 2.21 | 80 | 1.32 | 180 | 1.4 | 138 |
| 17 | 8.47 | 3.0 | 2.21 | 80 | 1.32 | 180 | 1.4 | 154 |
| 18 | 8.47 | 3.0 | 2.21 | 80 | 1.32 | 180 | 1.3 | 174 |
| 19 | 10.17 | 3.6 | 2.7 | 80 | 1.58 | 210 | 1.7 | 156 |
| 20 | 10.17 | 3.6 | 2.7 | 80 | 1.58 | 280 | 1.9 | 164 |
| 21 | 10.17 | 3.6 | 2.7 | 80 | 1.58 | 350 | 2.4 | 175 |
| 22 | 10.17 | 3.6 | 2.7 | 80 | 1.58 | 420 | 2.8 | 182 |

| Example | SEI [kWh/kg] | Mechanical properties | | Degree of gelation [%] | Residual thermal stability [min] |
|---|---|---|---|---|---|
| | | Tensile strength [N/mm$^2$] | Elongation at break [%] | | |
| 1 | 0.057 | 15.5 | 320 | 90 | 110 |
| 2 | 0.050 | 20 | 350 | 85 | 110 |
| 3 | 0.092 | 19 | 350 | 90 | 110 |
| 4 | 0.060 | 16.5 | 370 | 95 | 110 |
| 5 | 0.082 | 20 | 350 | 85 | 110 |
| 6 | 0.060 | 15.1 | 338 | 85 | 94 |
| 7 | 0.060 | 19.0 | 350 | 95 | 110 |
| 8 | 0.065 | 19.0 | 352 | 95 | 110 |
| 9 | 0.065 | 19.0 | 350 | 95 | 110 |

TABLE 2-continued

| | | | | | |
|---|---|---|---|---|---|
| 10 | 0.060 | 19.0 | 350 | 95 | 110 |
| 11 | 0.060 | 18.7 | 348 | 95 | 110 |
| 12 | 0.067 | n.a. | n.a. | n.a. | 62 |
| 13 | 0.135 | 345 | 21 | 95 | 100 |
| 14 | 0.135 | 380 | 22 | 95 | 110 |
| 15 | 0.135 | 320 | 20 | 95 | 140 |
| 16 | 0.075 | 5.3 | 58 | 37 | 125 |
| 17 | 0.075 | 8.5 | 113 | 58 | 105 |
| 18 | 0.068 | 16.1 | 328 | 88 | 138 |
| 19 | 0.076 | 9.2 | 132 | 68 | 105 |
| 20 | 0.081 | 14.5 | 328 | 76 | 145 |
| 21 | 0.103 | 17.6 | 365 | 95 | 145 |
| 22 | 0.119 | 15.5 | 368 | 100 | 145 |

The invention claimed is:

1. A method for extruding a homogeneous polymer composition, which has a degree of gelation of 60% to 100%, an elongation at break of at least 200%, and a tensile strength of at least 10 N/mm$^2$, from an uncompounded polyvinyl chloride, wherein the quantity of energy introduced into the polymer composition within the method, as indicated by the specific energy input (SEI), is 0.03 to 0.20 kWh/kg.

2. The method as claimed in claim 1, wherein the uncompounded polyvinyl chloride is polyvinyl chloride prepared by suspension polymerization.

3. The method as claimed in claim 1, wherein said extrusion apparatus is a planetary roller extruder, an annular extruder, a multiscrew extruder or a Buss kneader.

4. The method as claimed in claim 1, wherein the amount of energy introduced by the extrusion apparatus may be introduced both in the form of mechanical energy and in the form of thermal energy and that at the end of the extrusion apparatus a product temperature is reached of at least 150° C. up to at most 190° C.

5. The method as claimed in claim 1, wherein the homogeneous polymer composition has a residual thermal stability, determined according to DIN 53 381-1 at 180° C., of at least 60 minutes.

6. The method as claimed in claim 1, wherein the extrusion apparatus used for the extrusion comprises a pair of substantially isomorphous, elongate rotors which fit into the cavity and are disposed next to one another for interpenetrating movement.

7. The method as claimed in claim 6, wherein each of the rotors has a length L in the range of 32-60 times its diameter D.

8. The method as claimed in claim 6, wherein the polyvinyl chloride is admixed with a first portion of plasticizer at an L/D ratio in the range from 1 to 8 and with a second portion of plasticizer at an L/D ratio of 10 to 20.

9. The method as claimed in claim 1, the polymer composition consisting substantially of
   (A) 30 to 80 wt % of polyvinyl chloride,
   (B) 0.5-5 wt % of a stabilizing additive,
   (C) 0-40 wt % of a solid constituent, and
   (D) 5-40 wt % of a plasticizer, liquid at room temperature, for the polyvinyl chloride,
   where the figures in wt % are based in each case on the total weight of the polymer composition, and
   where the method comprises the steps of
   (I) feeding polyvinyl chloride (A) in uncompounded form into an extrusion apparatus having at least one rotor, which has at least three kneading and/or mixing zones and is capable of both transporting and mixing the mixture,
   (II) feeding the polyvinyl chloride (A) and stabilizing additive (B) into the extrusion apparatus through a first inlet, which is disposed in the vicinity of the drive unit and adjacent to a first conveying segment section of the at least one rotor;
   (III) feeding the plasticizer to the polyvinyl chloride mixed with the stabilizing additive through at least two inlets at a distance from one another, the plasticizer being added in at least two portions each of about 20-80 wt %, based on the total weight of the plasticizer, to the polyvinyl chloride, there being a kneading and/or mixing zone disposed between the addition of the individual portions,
   (IV) working the plasticizer/polyvinyl chloride mixture at a temperature of or above the glass transition temperature of the polyvinyl chloride, the temperature of the mixture not exceeding 150° C., until the plasticizer has been incorporated substantially completely into the polyvinyl chloride,
   (V) optionally feeding the solid constituent to the polyvinyl chloride mixed with the plasticizer in a section at which at least 80 wt % of the total amount of the plasticizer has been incorporated into the polyvinyl chloride,
   (VI) optionally devolatilizing and extruding the mixture through the extrusion die.

10. The method as claimed in claim 9, wherein the solid constituent is added to the polyvinyl chloride, mixed with the plasticizer, in a section at which at least 95 wt % of the plasticizer has been kneaded into the polyvinyl chloride.

11. The method as claimed in claim 9, wherein the polyvinyl chloride is admixed in step (V) with at least 80 wt %.

12. The method as claimed in claim 9, wherein the mixture of plasticizer and PVC is brought to a temperature of at least 30° C. below the glass transition temperature (Tg) of the polyvinyl chloride.

13. The method as claimed in claim 9, wherein the amount of the solid constituent in the polymer composition is 0.01 to 35 wt %.

14. The method as claimed in claim 9, wherein the solid constituent is incorporated into the polyvinyl chloride only after the plasticizer has been incorporated substantially completely into the polyvinyl chloride.

15. The method as claimed in claim 9, wherein the individual portions for the feeding of the plasticizer to the polyvinyl chloride, mixed with the stabilizing additive, in step (III) account for about 30 to 70 wt % based on the total weight of the plasticizer.

16. The method as claimed in claim 15, wherein the plasticizer is added in two portions to the polyvinyl chloride, with the portion added first making up 55±3 wt % and the portion added thereafter 45±3 wt % of the total amount of the plasticizer.

\* \* \* \* \*